(12) United States Patent
Cho et al.

(10) Patent No.: US 7,170,741 B2
(45) Date of Patent: *Jan. 30, 2007

(54) PORTABLE COMPUTER AND METHOD FOR MOUNTING A FLAT PANEL DISPLAY DEVICE MODULE

(75) Inventors: Young Woo Cho, Kyonggi-do (KR); Jong Hwan Kim, Kyonggi-do (KR); Dae Hee Park, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/153,730

(22) Filed: May 24, 2002

(65) Prior Publication Data

US 2002/0154476 A1 Oct. 24, 2002

Related U.S. Application Data

(63) Continuation of application No. 09/437,222, filed on Nov. 10, 1999, now Pat. No. 6,411,501.

(30) Foreign Application Priority Data

Nov. 11, 1998 (KR) .................................... 98-48265

(51) Int. Cl.
  *G06F 1/16* (2006.01)
(52) U.S. Cl. ...................... 361/681; 361/683
(58) Field of Classification Search ................ 361/685, 361/681, 683
See application file for complete search history.

(56) References Cited

U.S. PATENT DOCUMENTS

| 4,111,533 | A | 9/1978 | Nakamura et al. |
|---|---|---|---|
| 4,165,607 | A | 8/1979 | Fedorowicz et al. |
| 4,329,800 | A | 5/1982 | Shuman |
| 4,422,728 | A | 12/1983 | Andreaggi |
| 4,614,406 | A | 9/1986 | Motoi |
| 4,755,035 | A | 7/1988 | Kopish et al. |
| 4,781,422 | A | 11/1988 | Kimble |
| 4,937,709 | A | 6/1990 | Yanagi et al. |
| 4,959,887 | A | 10/1990 | Gruenberg et al. |

(Continued)

FOREIGN PATENT DOCUMENTS

EP   317 261   5/1989

(Continued)

OTHER PUBLICATIONS

Sony 14.1" Notebook PC, 6 pp.

(Continued)

*Primary Examiner*—Yean-Hsi Chang
(74) *Attorney, Agent, or Firm*—McKenna Long & Aldridge LLP

(57) ABSTRACT

Disclosed is a computer that includes: a system body having an input device; a display module having a display surface and a rear surface; a display case having a side wall surface; and a hinge pivotally coupling the body to the display module, the hinge including a hinge frame having first and second surfaces, the first surface coupled with the rear surface of the display module, the second surface coupled with the side wall surface of the display case.

32 Claims, 14 Drawing Sheets

U.S. PATENT DOCUMENTS

| | | |
|---|---|---|
| 5,001,468 A | 3/1991 | Brice et al. |
| 5,002,368 A | 3/1991 | Anglin |
| 5,041,965 A | 8/1991 | Chen |
| 5,102,084 A | 4/1992 | Park |
| 5,103,377 A | 4/1992 | Kobayashi et al. |
| 5,119,204 A | 6/1992 | Hashimoto et al. |
| D328,291 S | 7/1992 | Falkner |
| 5,128,662 A | 7/1992 | Failla |
| 5,168,426 A | 12/1992 | Hoving et al. |
| 5,173,837 A | 12/1992 | Blackwell et al. |
| 5,195,213 A | 3/1993 | Ohgami et al. |
| 5,216,411 A | 6/1993 | Ashitomi et al. |
| 5,229,920 A | 7/1993 | Spaniol et al. |
| 5,233,502 A | 8/1993 | Beatty et al. |
| 5,238,421 A | 8/1993 | Kobayashi |
| 5,264,992 A | 11/1993 | Hogdahl et al. |
| 5,268,816 A | 12/1993 | Abell, Jr. et al. |
| 5,272,601 A | 12/1993 | McKillip |
| 5,276,589 A | 1/1994 | Bartlett et al. |
| 5,328,379 A | 7/1994 | Kobayashi |
| 5,363,276 A | 11/1994 | Crockett |
| 5,379,182 A * | 1/1995 | Fujimori et al. ............. 361/681 |
| D356,077 S | 3/1995 | Harada et al. |
| 5,423,605 A | 6/1995 | Liu |
| 5,432,626 A | 7/1995 | Sasuga et al. |
| 5,467,504 A * | 11/1995 | Yang ........................... 16/342 |
| 5,479,285 A | 12/1995 | Burke |
| 5,483,253 A | 1/1996 | Suganuma et al. |
| 5,486,942 A | 1/1996 | Ichikawa et al. |
| 5,494,447 A | 2/1996 | Zaidan |
| 5,504,605 A | 4/1996 | Sakuma et al. |
| 5,546,270 A | 8/1996 | Konno et al. |
| 5,559,670 A | 9/1996 | Flint et al. |
| 5,566,048 A * | 10/1996 | Esterberg et al. ........... 361/681 |
| 5,570,267 A | 10/1996 | Ma |
| 5,583,529 A | 12/1996 | Satou |
| 5,634,351 A | 6/1997 | Larson et al. |
| 5,636,101 A | 6/1997 | Bonsall et al. |
| 5,636,102 A | 6/1997 | Fujino et al. |
| 5,654,779 A | 8/1997 | Nakayama et al. |
| 5,666,172 A | 9/1997 | Ida et al. |
| 5,673,170 A | 9/1997 | Register |
| 5,680,183 A | 10/1997 | Sasuga et al. |
| 5,682,645 A | 11/1997 | Watabe et al. |
| 5,689,400 A | 11/1997 | Ohgami et al. |
| 5,771,539 A | 6/1998 | Wahlstedt et al. |
| 5,805,117 A | 9/1998 | Mazurek et al. |
| 5,805,125 A | 9/1998 | Suganuma et al. |
| 5,825,613 A | 10/1998 | Holden |
| 5,831,816 A | 11/1998 | Johns et al. |
| 5,835,139 A | 11/1998 | Yun et al. |
| 5,835,343 A | 11/1998 | Johns et al. |
| 5,844,772 A | 12/1998 | Lee et al. |
| 5,844,774 A * | 12/1998 | Gushiken et al. ........... 361/681 |
| 5,872,606 A * | 2/1999 | Kim .............................. 249/68 |
| 5,905,550 A | 5/1999 | Ohgami et al. |
| 5,946,061 A * | 8/1999 | Kurihara et al. ............... 349/58 |
| 6,064,565 A * | 5/2000 | Ishihara et al. ............. 361/681 |
| 6,068,227 A | 5/2000 | Morgan et al. |
| 6,128,183 A | 10/2000 | Uchiyama et al. |
| 6,144,423 A | 11/2000 | Kim |
| 6,304,432 B1 | 10/2001 | Kim |
| 6,430,039 B2 * | 8/2002 | Nakajima et al. ........... 361/681 |
| 6,693,794 B2 | 2/2004 | Kim |

FOREIGN PATENT DOCUMENTS

| | | |
|---|---|---|
| EP | 0 425 793 | 5/1991 |
| EP | 0 532 284 | 3/1993 |
| EP | 0 604 872 | 7/1994 |
| GB | 2 223 875 | 4/1990 |
| GB | 2 305 689 | 4/1997 |
| GB | 2 305 690 | 4/1999 |
| JP | 64-017313 | 1/1989 |
| JP | 01237591 | 9/1989 |
| JP | 02079893 | 3/1990 |
| JP | 03129986 | 6/1991 |
| JP | 5-80334 | 4/1993 |
| JP | 05-188810 | 7/1993 |
| JP | 06-214511 A | 8/1994 |
| JP | 07-020447 A | 1/1995 |
| JP | 07199180 | 8/1995 |
| JP | 07281184 | 10/1995 |
| JP | 08211964 | 8/1996 |
| JP | 9-171358 | 6/1997 |
| JP | 09-190156 | 7/1997 |
| JP | 10-117313 | 6/1998 |
| KR | 1019980041727 | 8/1999 |
| WO | WO 90/10924 | 9/1990 |
| WO | WO 90/15359 | 12/1990 |

OTHER PUBLICATIONS

IBM Monitor, Model #9516, 13 pp.
Pixel Vision SGT15P, 9 pp.
IBM Monitor, Model # 39H7116, 7 pp.
View Sonic Corporation Monitor, Model # VPA138, 6 pp.
View Sonic Corporation Monitor, Model # VP140, 5 pp.
Cockpit Displays III (SPIE-The International Society for Optical Engineering) vol. 2734, 12 pp.
IBM Electronic Pocket Reference Manual for the IBM 9516-A03 Monitor, 29 pp.
Murata et al., 10.4-inch TFT Liquid Crystal Display or Sub-Note Type Personal Computers, National Technical Report, Dec. 1997, vol. 43, Issue 6, pp. 56-61, w/English Abstract.

* cited by examiner

PORTABLE COMPUTER AND METHOD FOR MOUNTING A FLAT PANEL DISPLAY DEVICE MODULE

This application is a continuation of application Ser. No. 09/437,222 filed Nov. 10, 1999 now U.S. Pat. No. 6,411,501, which is hereby incorporated by reference as if fully set forth herein.

This application claims the benefit of Korean Patent Application No. 1998-48265, filed on Nov. 11, 1998, which is hereby incorporated by reference for all purposes as if fully set forth herein.

BACKGROUD OF THE INVENTION

1. Field of the Invention

The present invention relates generally to a flat panel display device, and more particularly, to a flat panel display device mounting structure on a computer.

2. Description of the Related Art

Flat panel display devices include liquid crystal display (LCD) devices which are used widely, plasma display panels (PDP), and field emission displays (FED) which have been studied recently and may be applied to computers in the near future.

For convenience of explanation, the present invention will be discussed with respect to the LCD as an example of a flat screen type display device and a portable computer mounted with the LCD.

Referring to FIG. 1, a general portable computer such as a laptop or notebook computer typically includes a body 100, a flat panel display device assembly 110 coupled to the body 100 via a hinge mechanism 124. The flat panel display device assembly 110 has a flat panel display module 111 and a display case 122 supporting the module 111. The body 100 has an input device 102 such as a keyboard. As a flat panel display module 111, the LCD is widely used in portable computers and flat screen monitors.

Referring to FIG. 2 which shows a conventional assembly structure of the LCD device applied to a conventional portable computer, the display case 122 has a rear case 123 and a front case or frame 121 for mounting the LCD module 130. The rear case 123 has an outer surface and an inner surface and connecting ribs 123a formed at the corners.

The LCD module 130 has an LCD panel 132, a back light device 134 fixed to the back of the LCD panel 132, and a metal sash or supporting frame 136 for assembling the panel 132 and the back light device 134 along the edge.

At the corners of the metal sash 136, corresponding to the positions of the ribs 123a of the rear case 123, a plurality of protrusions 136a having holes are formed.

For mounting the LCD module 130 to the case 122, the LCD module 130 is placed on the rear case 123 and the holes of the metal sash 136 and the ribs 123a are fastened together preferably by screws 138. The front case 121 is coupled to the rear case 123.

Hereinafter, the way in which the LCD module is mounted to the case from the front toward the rear direction is defined as the front mounting method, and the assembled structure of the LCD module and the case made through the front mounting method is defined as the front mounting structure.

In the front mounting structure of the LCD module 130, since the protrusions 136a require additional space corresponding to the protruded width "d", the ratio of the display area of the LCD module 130 to the fixed size of the case 122 is reduced.

The front mounting structure may also include an additional feature to further support the LCD panel, as shown in FIGS. 3A and 3B.

Referring to FIGS. 3A and 3B, a conventional LCD device assembly 110 includes an LCD panel 112, a back light device (not shown) for the LCD panel 112, and a display case 122 supporting an LCD module 111. The LCD panel 112 and the back light device are assembled by a metal sash 114 along the edges together with a plastic mold frame (not shown) supporting the back light device.

The display case 122 is coupled to a body 120 via a hinge mechanism 124, which may extend from the body 120. The display case 122 and the hinge mechanism 124 allow the LCD device assembly 110 to pivotally move with respect to the body 120.

Two opposite sides of the metal sash 114 include flanges 114a for assembling the LCD module 111 to the display case 122, and flanges 114b for assembling the LCD module 111 to the hinge frame or hinge arm 126. Hereinafter, the former is referred as a fixing flange and the latter is referred as a mounting flange in this specification for distinction purposes. As shown in FIG. 3B, the fixing flanges 114a have a protruding width d2 and the mounting flanges 114b have a protruding width d1. A screw hole is formed in each of the flanges 114a and 114b. On the inner or bottom interior surface of the display case 122, ribs 122a are formed corresponding to the holes of the fixing flange 114a.

To mount the LCD module 111, the hinge frame 126 and the mounting flanges 114b of the metal sash 114 are screwed together, and the fixing flanges 114a of the metal sash 114 and the ribs 122a are screwed together by bolts 128.

In the mounting structure shown in FIG. 3B, the metal sash or support frame 114 requires side spaces for the flanges 114a and 114b. Therefore, the side space D (d1+d2) results in a reduction of the ratio of the display area of the LCD panel 112 relative to the display case 122. Moreover, as the display panel size increases, the display case 122 becomes undesirably large, especially for a portable computer such as a laptop computer.

To solve the above problem, an assembling structure has been suggested, as shown in FIG. 4, which is a partial perspective view. The hinge arm or frame 126, the case 122 and the side wall portion of the display module 110 are screwed together by bolts 128. However, although the embodiment shown in FIG. 4 is a good solution, there may be some instances where it is desired to attach the hinge arm, the case and the side wall portion of the display module without using a screw hole in the side wall portion of the display module or to attach the hinge arm with the case (FIG. 3A).

SUMMARY OF THE INVENTION

Accordingly, the present invention is directed to a portable computer that substantially obviates one or more of the problems due to limitations and disadvantages of the related art.

An object of the present invention is to minimize the non-display area of the LCD device.

Another object of the present invention is to provide a computer having a flat panel display device with a maximum display area and a minimal display case size.

A further object of the present invention is to provide a firm mounting structure for a flat panel display device on a computer.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and the in accordance with the purpose of the present invention, as embodied and broadly described, the present invention provides, in one aspect, a computer including: a system body having an input device; a display module having a display surface and a rear surface; a display case having a side wall surface; and a hinge pivotally coupling the body to the display module, the hinge including a hinge frame having first and second surfaces, the first surface coupled with the rear surface of the display module, the second surface coupled with the side wall surface of the display case.

In another aspect, the present invention provides a portable computer including: a system body; a display module having a display surface and a side wall surface; a display case having an inner surface; and a hinge pivotally coupling the body to the display case, the hinge including a hinge frame having first and second surfaces, the first surface coupled with the inner surface of the display case, the second surface coupled with the side wall surface of the display module.

In another aspect, the present invention provides a computer including: a system body; a display module having a display surface; a display case having side walls, the display module secured between the side walls of the display case; and a hinge pivotally coupling the body to the display case, the hinge including a hinge frame coupled to the inner surface of the display case.

The present invention according to a first embodiment provides a method for mounting a display module in a portable computer including a system body, a display case having a side wall surface, a hinge having a hinge frame having first and second surfaces, the first surface being substantially parallel to a rear surface of the display module, the second surface being substantially parallel to the side wall surface of the display case, the hinge pivotally coupling the system body to the display case, the method comprising: arranging the hinge frame so that the first surface thereof is positioned between the display case and the rear surface of the display module, and so that the second surface thereof is positioned between the display module and the side wall surface of the display case; fastening the first surface of the hinge frame to the rear surface of the display module; and fastening the second surface of the hinge frame to the side wall surface of the display case.

The present invention according to a second embodiment provides a method for mounting a display module having a side wall surface in a portable computer including a system body, a display case having inner and side wall surfaces, a hinge having a hinge frame having first and second surfaces, the first surface being substantially parallel to a rear surface of the display module, the second surface being substantially parallel to the side wall surface of the display case, the hinge pivotally coupling the system body to the display case, the method comprising: arranging the hinge frame so that the first surface thereof is positioned between the display case and the rear surface of the display module, and so that the second surface thereof is positioned between the display module and the side wall surface of the display case; fastening the first surface of the hinge frame to the inner surface of the display case; and fastening the second surface of the hinge frame to the side wall surface of the display module.

The present invention according to a second embodiment also provides a method for mounting a display module having a side wall surface in a portable computer including a system body, a display case having an inner and two side wall surfaces, a hinge having a hinge frame, the hinge pivotally coupling the system body to the display case, the method comprising: arranging the hinge frame so that a surface thereof is positioned between the inner surface of the display case and the rear surface of the display module; fastening the surface of the hinge frame to the inner surface of the display case; and securing the display module between the side walls of the display case.

Preferably, the display module is a liquid crystal display device (LCD) module.

Preferably, the first and second surfaces of the hinge frame are substantially perpendicular to each other.

Preferably, the first surface of the hinge frame has at least one fixing protrusion protruded toward the rear surface of the display module, and the rear surface of the display module has at least one fixing hole corresponding to the fixing protrusion of the first surface.

Preferably, the fixing protrusion is a fastener.

Preferably, the second surface of the hinge frame is screw-coupled with the side wall surface of the display case.

Preferably, the hinge frame further has a third surface for supporting an edge of the display surface of the display module, and the third surface is substantially perpendicular to the second surface.

Preferably, the fixing protrusion is a fastener.

It is to be understood that both the foregoing general description and the following detailed description are exemplary and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the preferred embodiments of the present invention, an example of which is illustrated in the accompanying drawings.

Figure 1:
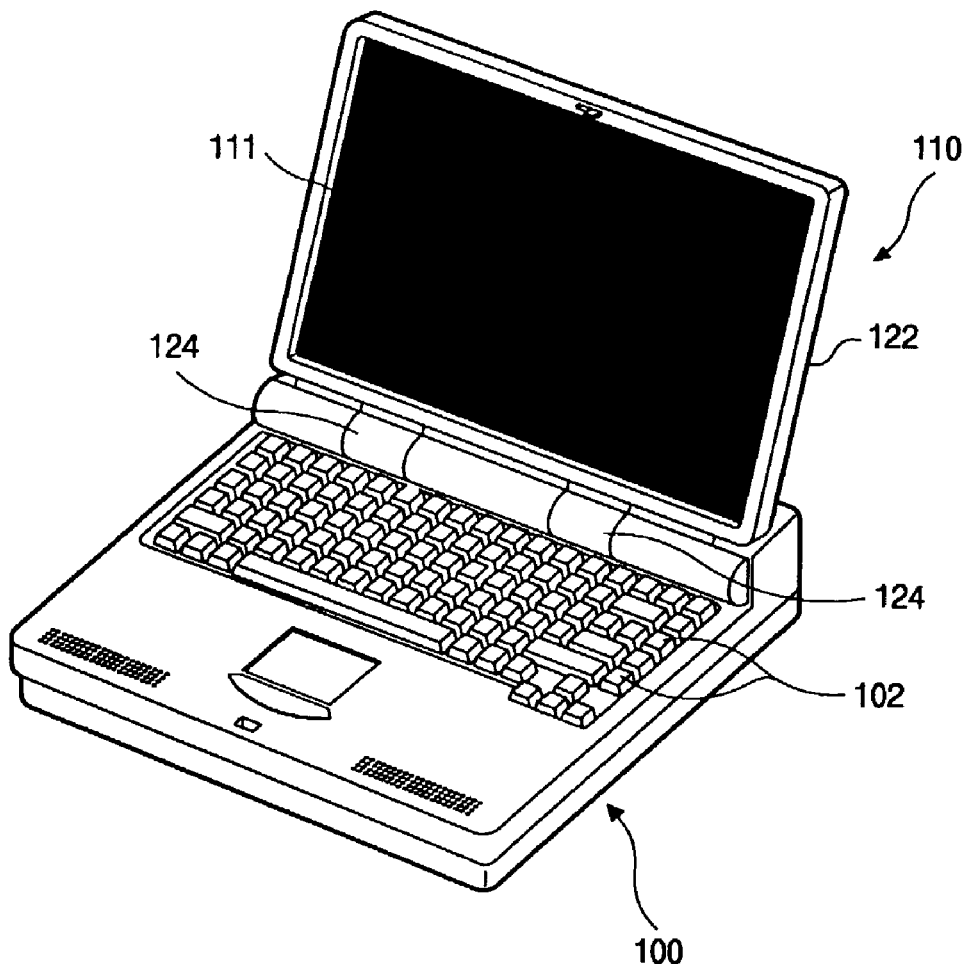
FIG. 1 is a perspective view showing a general portable computer.
Figure 2:
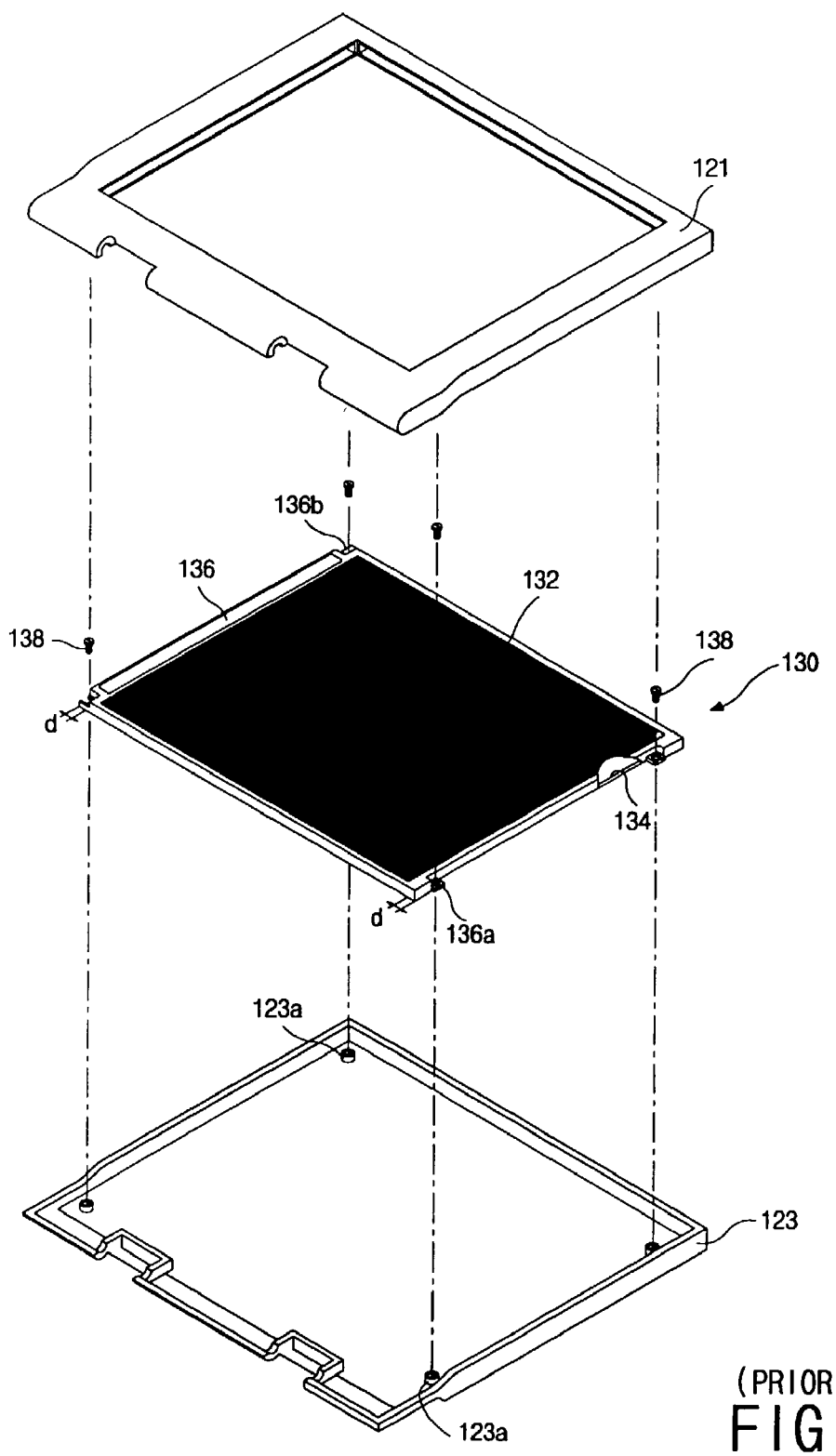
FIG. 2 shows a structure for mounting an LCD device for a portable computer.
Figure 3A:
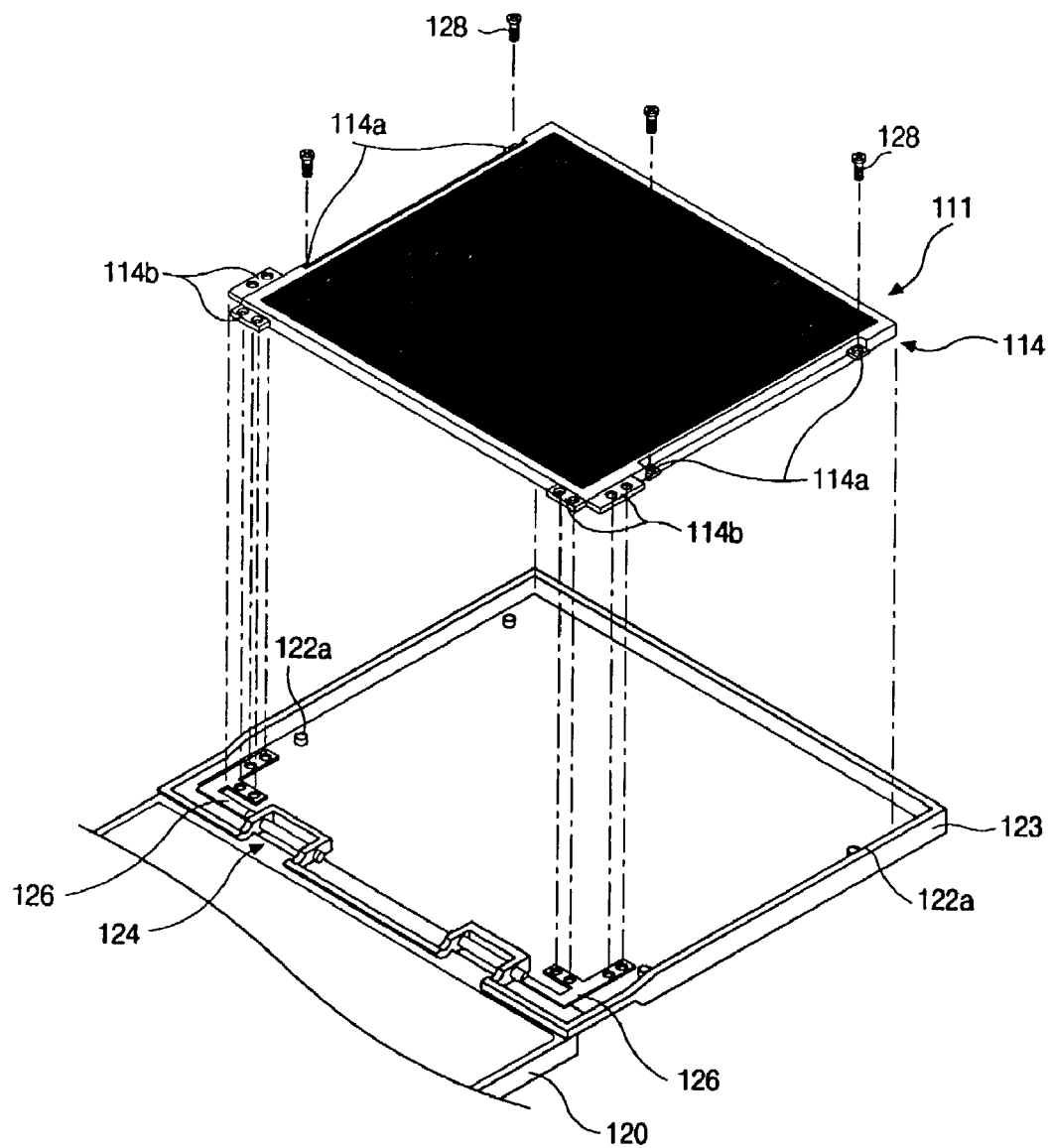
FIGS. 3A and 3B are a perspective view and a front view, respectively, showing a structure for mounting an LCD device for a portable computer.
Figure 3B:
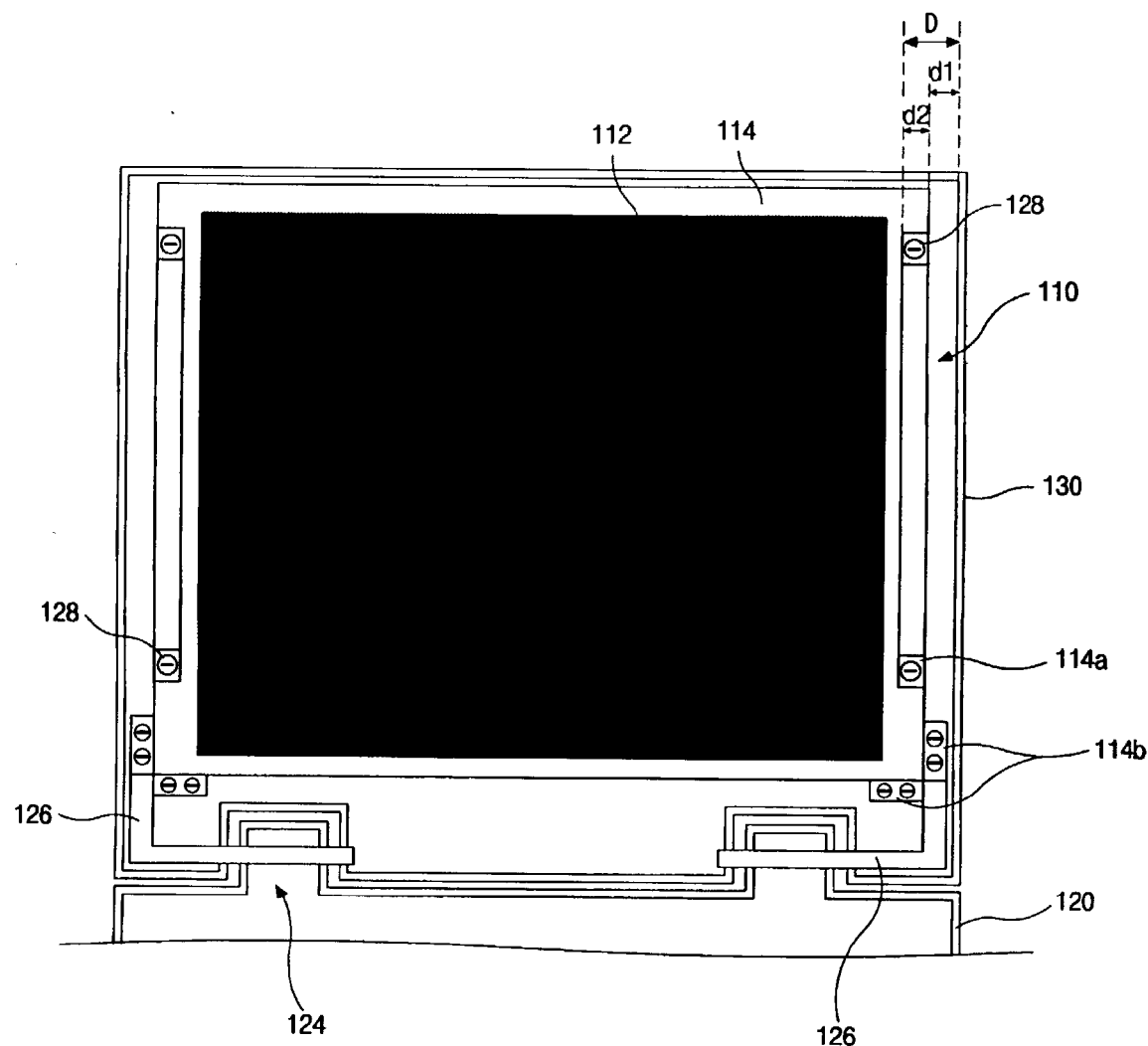
Figure 4:
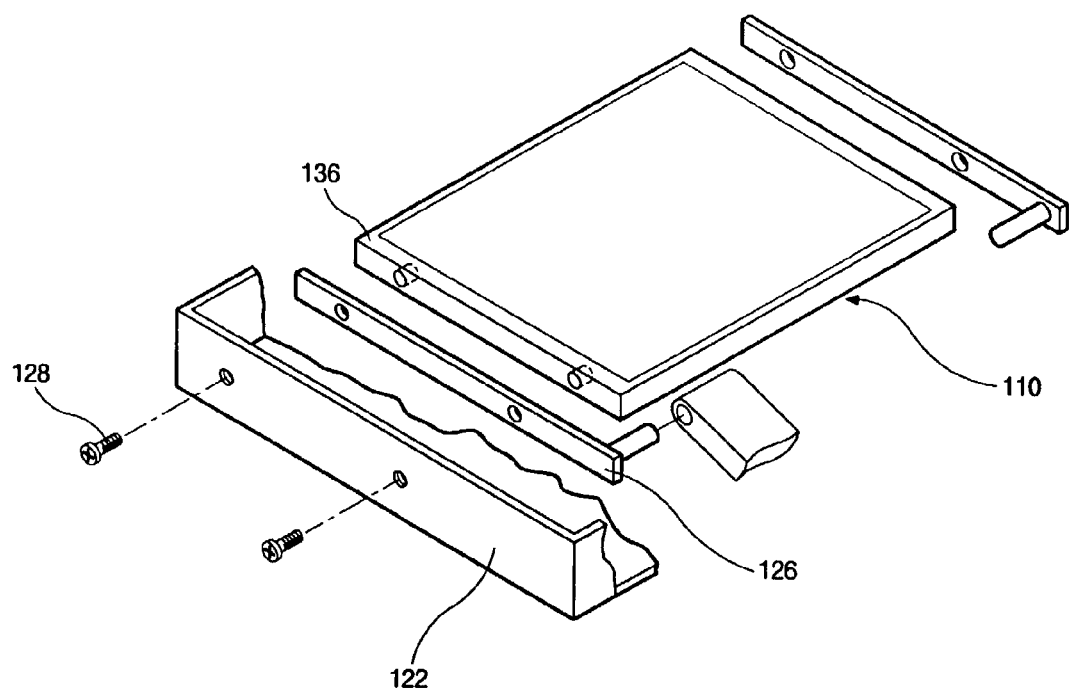
FIG. 4 is a partial view showing another mounting structure of the LCD device for a conventional portable computer.
Figure 5:
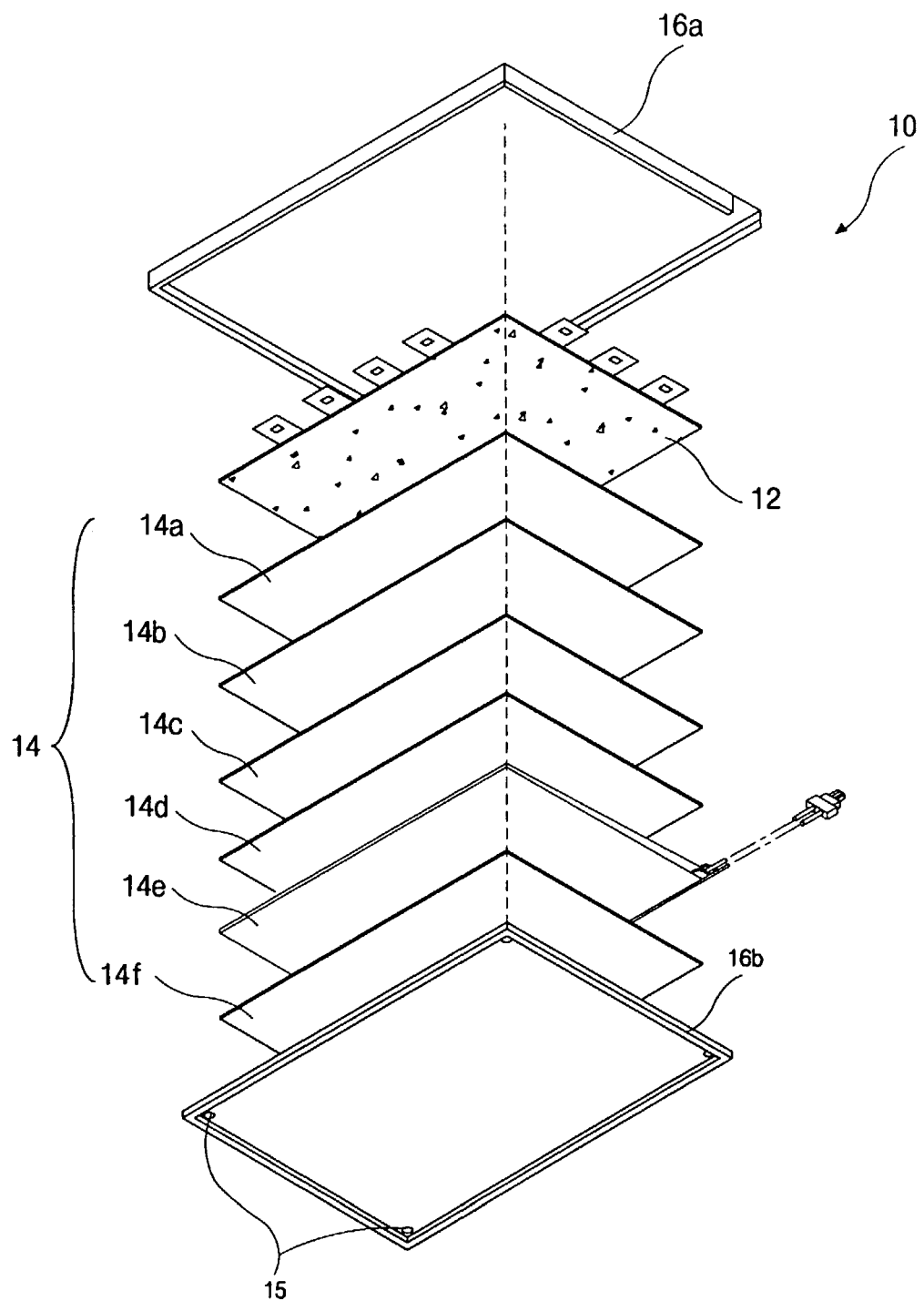
FIG. 5 is an exploded perspective view illustrating a structure for mounting a liquid crystal display module of a portable computer according to a first embodiment of the present invention.
Figure 6:
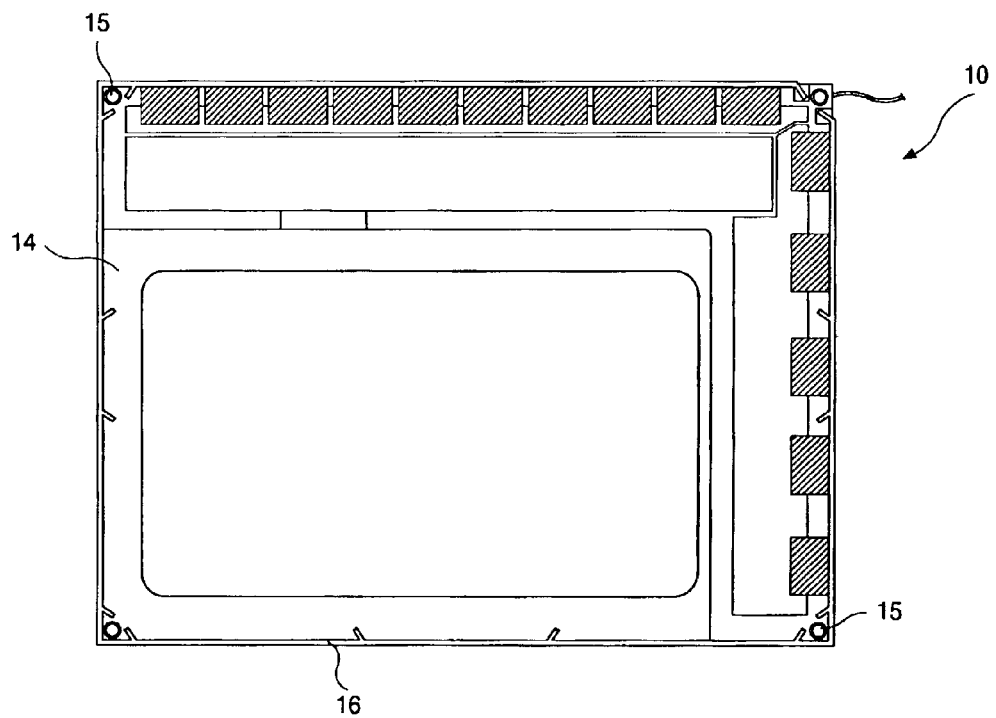
FIG. 6 is a bottom view illustrating a rear surface of a liquid crystal display module of a portable computer according to the first embodiment of the present invention.

Referring FIGS. 5 and 6, which show a first embodiment, a display module 10 (which may be a liquid crystal display module) has a display panel 12 and a back light device 14, both of which are assembled to each other by first and second frames 16a and 16b. The back light device 14 comprises a reflective plate 14a, a wave guide plate 14b, a first diffuser/protecting sheet 14c, a first prism sheet 14d, a second prism sheet 14e, and a second diffuser/protecting sheet 14f, which are layered in this order. The display panel 12 and the back light device 14 are supported by first and second frames 16a and 16b, and the second frame 16b has a fixing hole 15. As shown in FIG. 5, a plurality of fixing holes 15 are preferably arranged at each corner of the display module 10. The fixing holes 15 may have the shape of a rib, if necessary.

Figure 7:
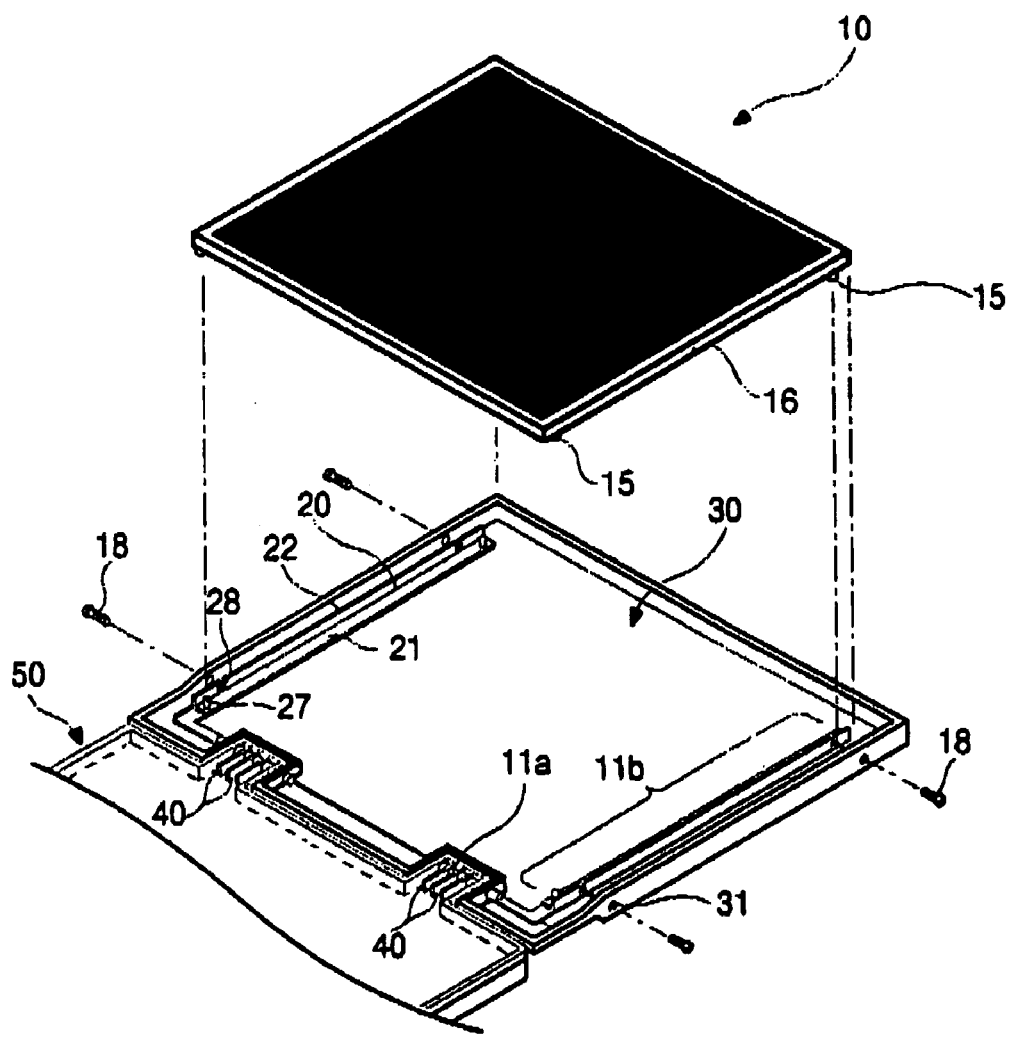
FIG. 7 is a partially exploded perspective view illustrating a structure for mounting a liquid crystal display module of a portable computer according to a first embodiment of the present invention.

FIG. 7 is a partially exploded perspective view illustrating structure for mounting a liquid crystal display module of a portable computer according to a first.

A hinge mount 40 is positioned at a protruded portion of a system body 50 such that a display assembly having the display module 10 and the display case 30 pivotally moves with respect to the body 50. A hinge frame 20 is positioned on an inner, or bottom interior, surface of the display case 30. The hinge frame 20 is comprised of a pin portion 11a at its one end, which is inserted into the hinge mount 40, and a "L"-shaped portion 11b which has first and second surfaces 21 and 22. The first surface 21 is parallel to a rear surface of the display module 10, and the second surface 22 is parallel to a side wall surface of the display module 10. The pin portion 11a can be coupled to the L-shaped portion 11b or be integrally formed with the L-shaped portion 11b. The hinge frame 20 also extends along the side wall surface of the display module 10. The first surface 21 has at least one fixing protrusion 27 corresponding to the fixing holes 15 of the rear surface of the display module 10, and the second surface 22 has at least one hole 28 corresponding to the through holes 31 of the side wall surface of the display case 30.

A preferred method for mounting the display module 10 according to the first embodiment is explained hereinafter.

The fixing protrusion 27 of the second surface 22 of the L-shaped portion 20b of the hinge frame 20 is inserted into the fixing holes 15 of the display module 10 such that the display module 10 is secured. Then a coupling member 18 such as a screw and a nail passes through the hole 28 of the second surface 22 and the through holes 31 of the display case 30 such that the hinge frame 20 is fixed to the display case 30.

Also, the fixing protrusion 27 preferably has the shape of a plastic hook or a fastener for firmly holding the display module 10, and an inlet portion of the fixing hole 15 is preferably narrower than an interior portion of the fixing hole 15.

Figure 8:
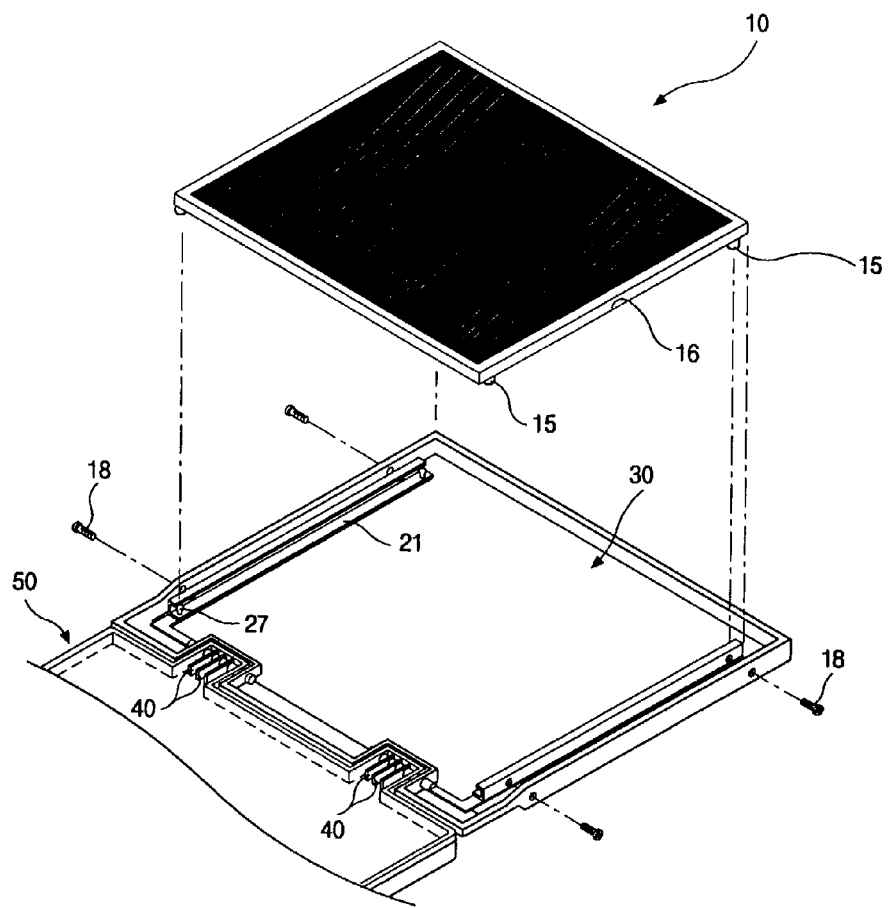
FIG. 8 is a partially exploded perspective view illustrating a modification of a structure for mounting a liquid crystal display module of a portable computer according to a first embodiment of the present invention.

To provide a more shockproof and shake-proof mounting structure, the hinge frame can have the shape of "C" as shown in FIG. 8. That is, the hinge frame 20 further has a third surface 23 to support both upper edges of opposing sides of the display module 10 parallel to the hinge frame 20. The first and third surfaces 21 and 23 can be integrally formed with the second surface 22, or can be attachable brackets.

Figure 9:
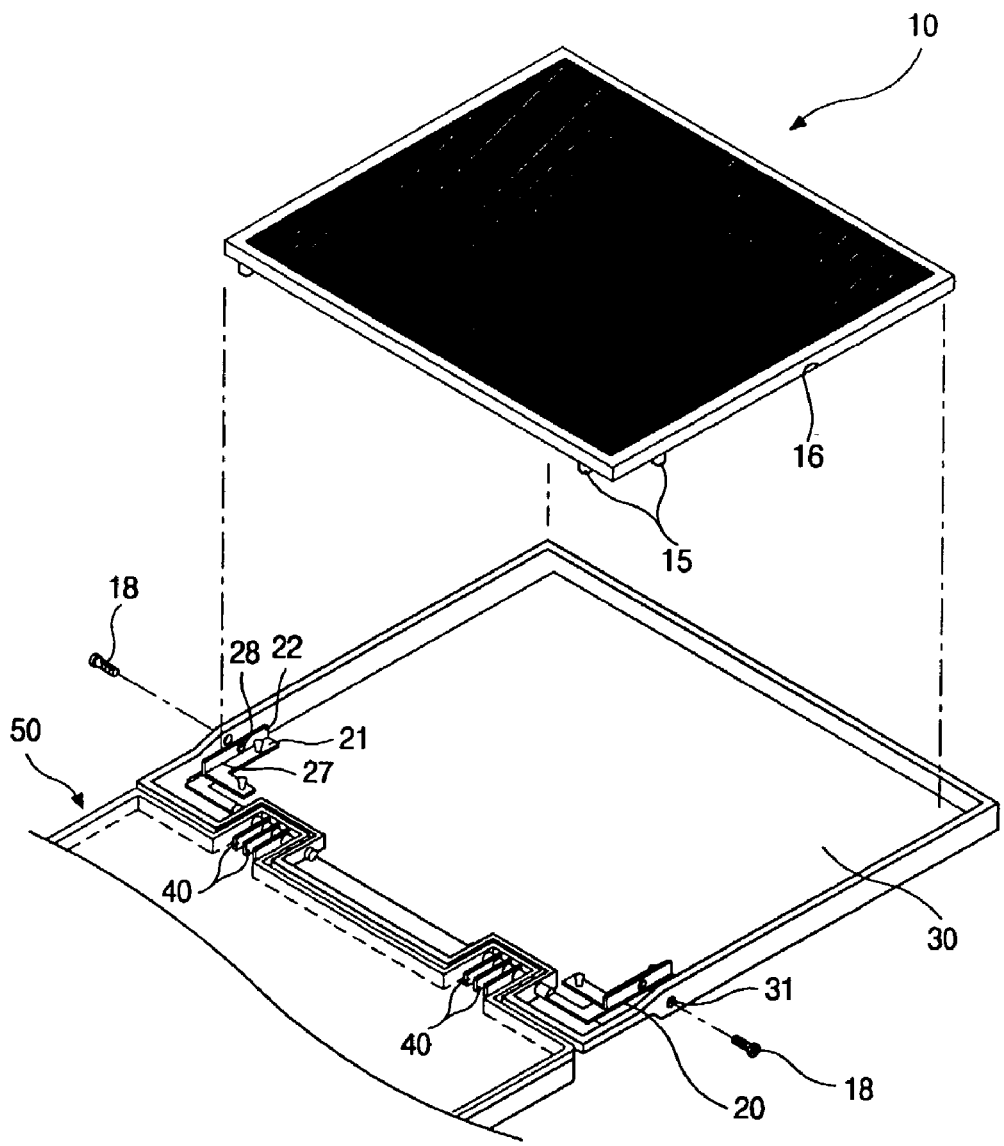
FIG. 9 is a partially exploded perspective view illustrating another modification of a structure for mounting a liquid crystal display module of a portable computer according to a first embodiment of the present invention.

FIG. 9 shows another modification of the first embodiment.

The hinge frame 20 can have a reverse "F" shaped first surface 21 to hold the display module 10, instead of a long elongated first surface 21 (see Fig.7).

Figure 10A:
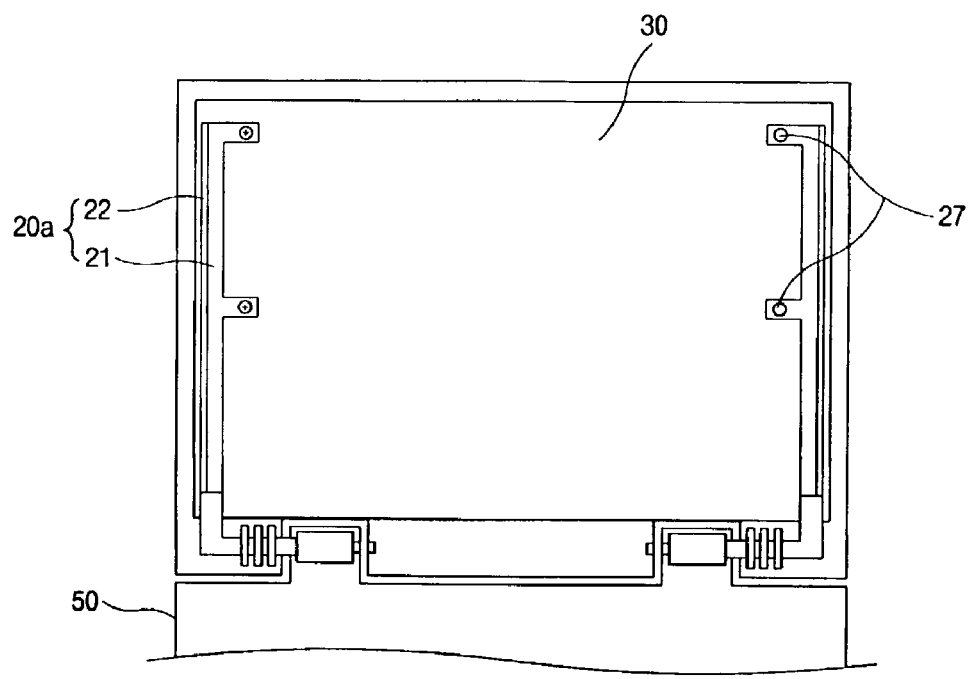
FIGS. 10A, 10B and 10C are partially exploded perspective views illustrating various modifications of a structure for mounting a liquid crystal display module of a portable computer according to a first embodiment of the present invention
Figure 10B:
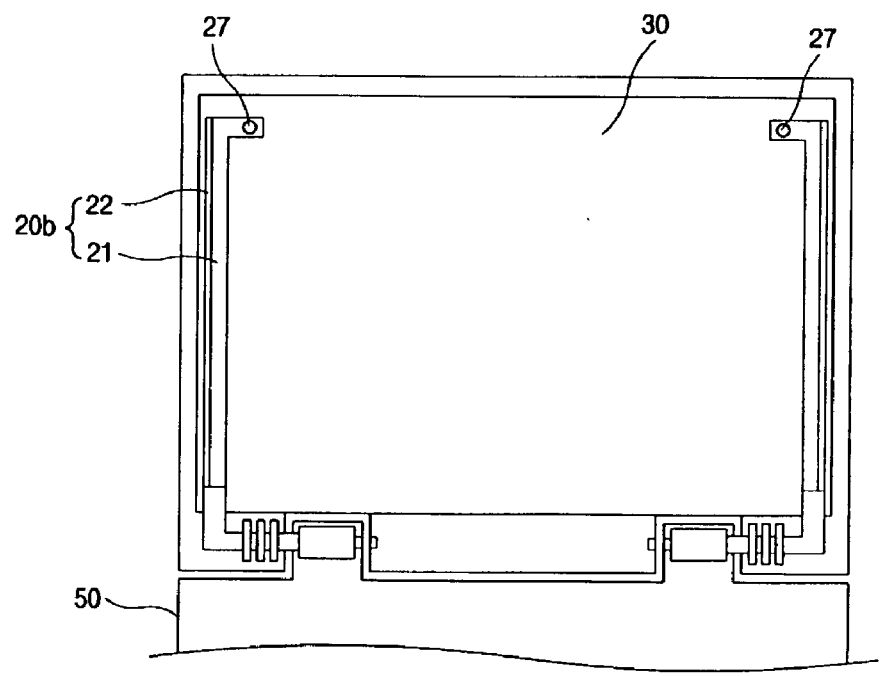
Figure 10C:
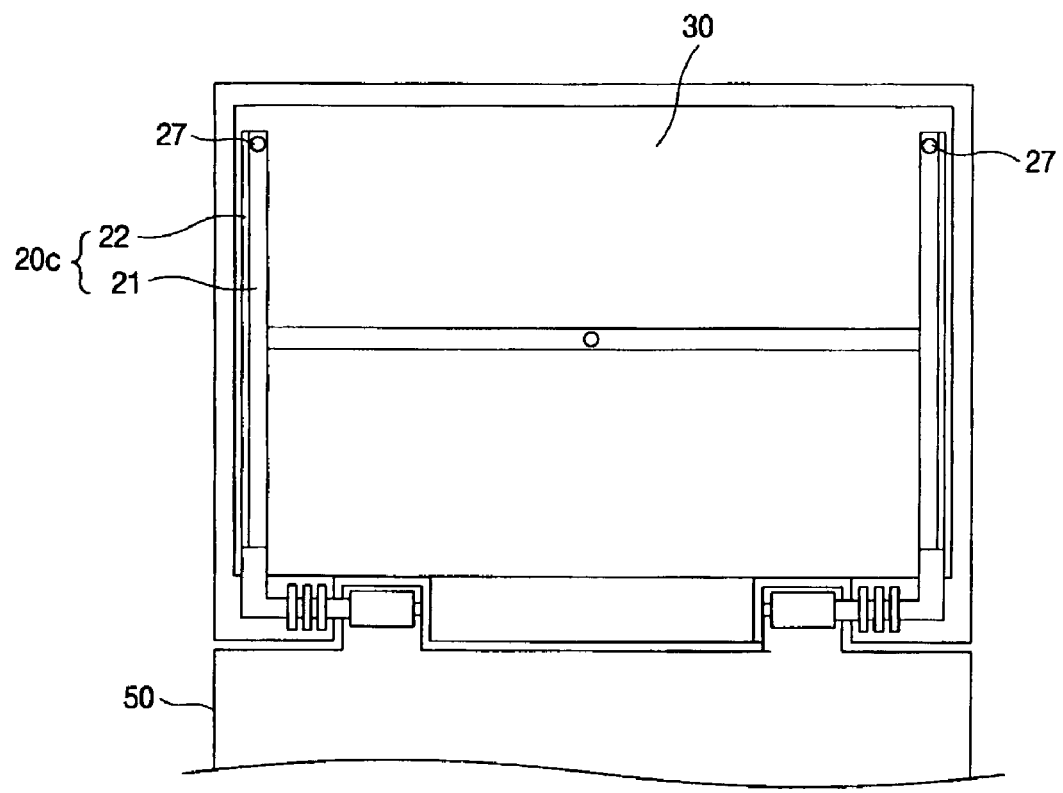

FIGS. 10A, 10B and 10C are other modifications of a mounting structure according to the first embodiment.

The hinge frames 20a, 20b and 20c may have various shapes of first surfaces 21 to enhance a fixing force of a display module 10.

Figure 11:
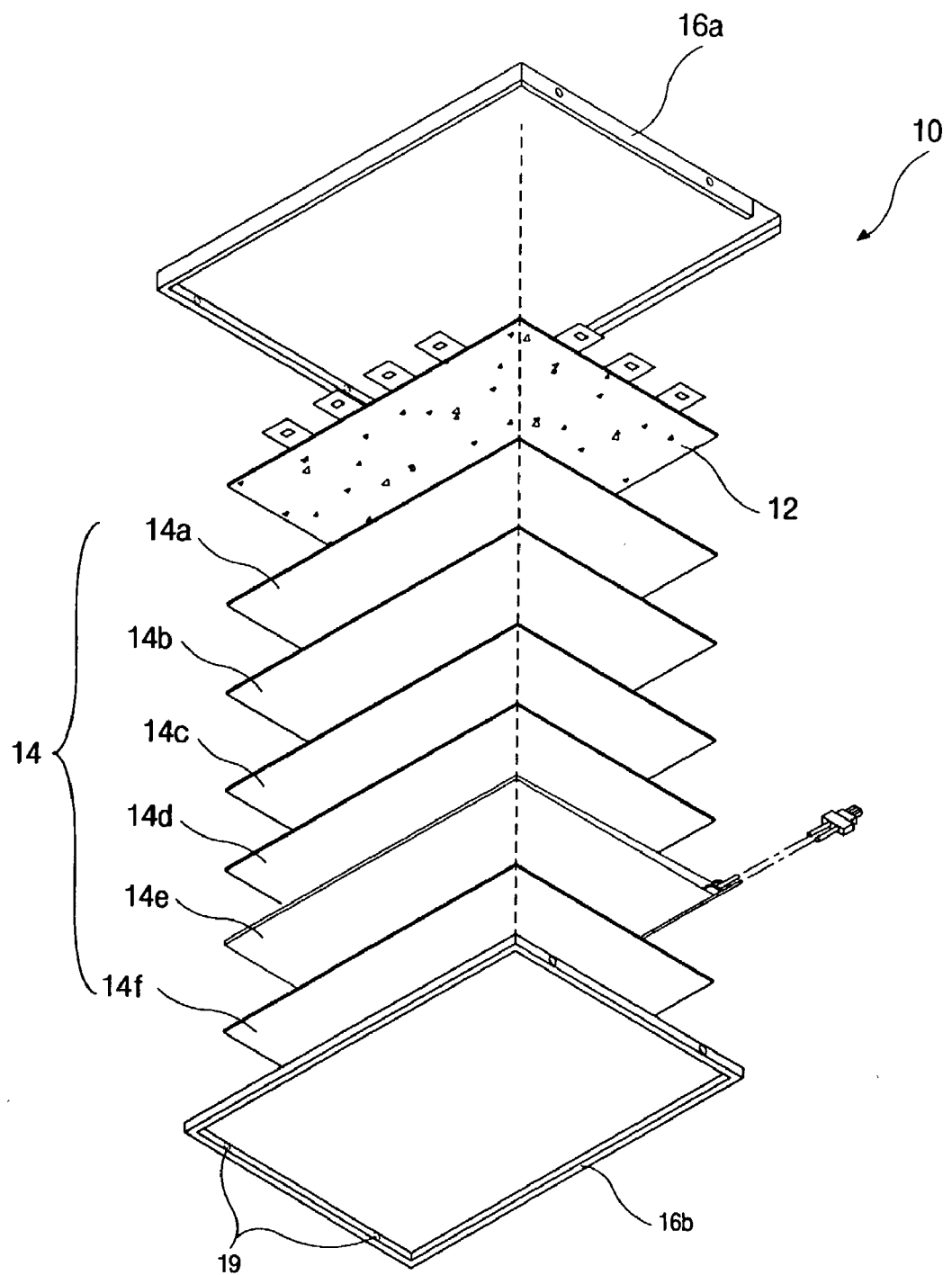
FIG. 11 is an exploded perspective view illustrating a liquid crystal display module according to a second embodiment according to the invention.

FIG. 11 illustrates a second embodiment, wherein the structure of the display module is similar to that shown in FIG. 5, and therefore, the explanation thereof is not repeated here. However, the display module 10 has a plurality of fixing holes 19 on the side wall surface thereof other than the rear surface thereof. The fixing holes 19 are for a side mounting method wherein the side wall of the display module 10 is coupled to a hinge frame or to the case. That is, the display module 10 can be assembled to the hinge frame 20 (see FIG. 7) not to the case 30 (see FIG. 7). It is also possible that the display module 10 is assembled to the case 30 directly, without engaging the hinge frame 20 therebetween.

Figure 12:
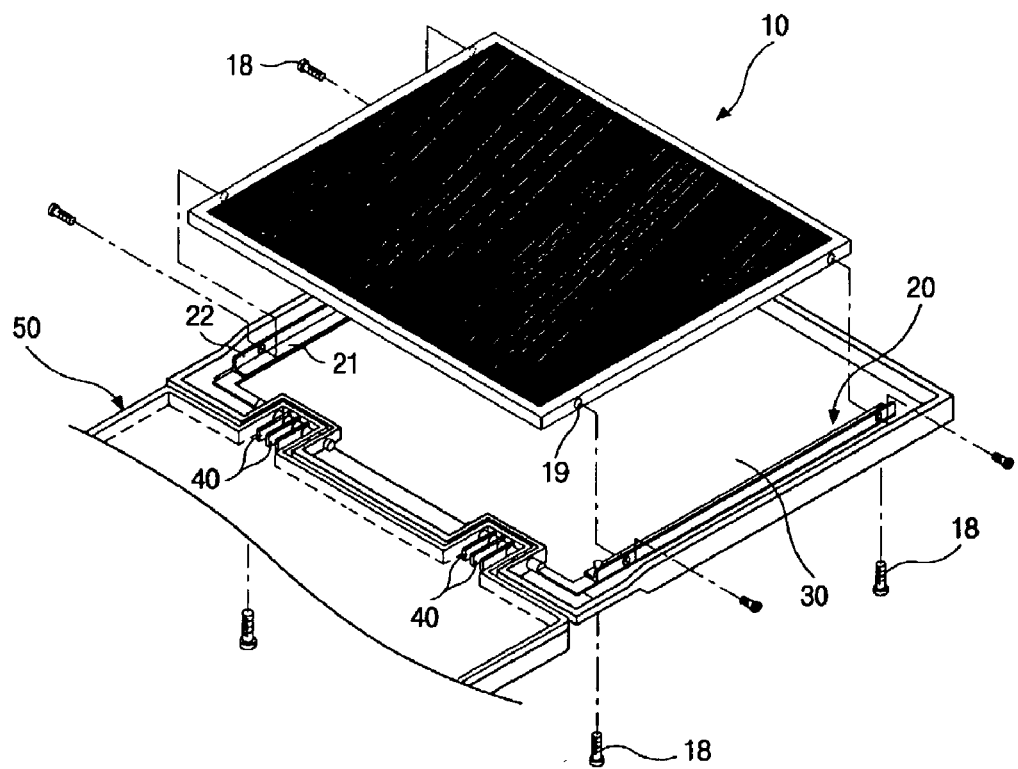
FIG. 12 is a partially exploded perspective view illustrating a structure for mounting a liquid crystal display module of a portable computer according to a second embodiment of the present invention.

FIG. 12 shows an exemplary mounting structure wherein the hinge frame is assembled to the inner, or bottom interior, surface of the case 30 and the display module 10 is mounted inside of the case 30. Preferably, the hinge frame 20 has an "L" shape and has a first surface 21 contacting with the rear surface of display module 10 and a second surface 22 contacting with the side wall surface of the display module 10. The display case 30 has a plurality of screw holes (not shown) on the inner surface thereof, and the first surface 21 of the hinge frame 20 has a plurality of screw holes 25 corresponding to the screw holes of the display case 30. Further, the second surface 22 of the hinge frame 20 preferably has a plurality of screw holes 26 corresponding to the screw holes 19 of the side wall surface of the display module 10. Thus, the first surface 21 of the hinge frame 20 is coupled with the display case 30, and the second surface 22 of the hinge frame 20 is coupled with the display module 10.

Figure 13:
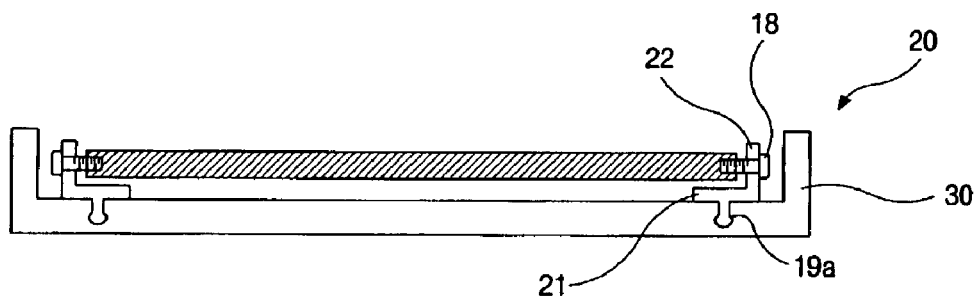
FIG. 13 is a partially exploded perspective view illustrating another structure for mounting a liquid crystal display module of a portable computer according to a second embodiment of the present invention.

FIG. 13 shows another exemplary mounting structure of the second embodiment. The structure of FIG. 13 also shows a mounting structure wherein the hinge frame 20 is assembled to the inner surface of the case 30.

The first surface 21 of the hinge frame 20 has a plurality of plastic hooks or fasteners protruded toward the inner surface of the case 30, and the display case 30 has a plurality of fastener fixing holes 19a corresponding to the fastener, thereby the first surface 21 of the hinge frame 20 is coupled with the display case 30 by pressing the first surface 21 without tightening a screw.

In the second embodiment, instead of a screw and fastener, a nail can be employed. Further, the hinge frame may be "C" shaped, and a bracket having a long length may be used instead of the hinge frame integrally formed with the pin portion. The hinge frame may have a short length.

As described until here, using the mounting structure according to the invention, the display area is maximized, and a more shock-proof display assembly is provided. Further, the mounting structure according to one embodiment of the invention has an advantage that the display assembly can be assembled to the case without tightening a screw into the side wall surface of the display module. The invention also shows that the hinge frame of the invention can be assembled to a rear surface of the display module or to an inner surface of the case.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A portable computer comprising:
   a system body having an input device;
   a display module having a display surface;
   a display case having walls, the display module secured between the walls of the display case; and
   a hinge pivotally coupling the display module and the display case to the system body, the hinge including a hinge frame having first, second and third surfaces,
   wherein the first surface is coupled to the inner surface of the display case, and the second surface is coupled to the side wall surface of the display case, the third surface is over a portion of the first surface.

2. The computer of claim 1, wherein the display module is a liquid crystal display (LCD) module.

3. The computer of claim 2, wherein the first and second surfaces of the hinge frame are substantially perpendicular to each other.

4. The computer of claim 3, wherein the third and second surfaces of the hinge frame are substantially perpendicular to each other.

5. A portable computer comprising:
   a system body having an input device;
   a display module having a display surface, the display module being a liquid crystal display (LCD) module;
   a display case having walls, the display module secured between the walls of the display case; and
   a hinge pivotally coupling the display module and the display case to the system body, the hinge including a hinge frame having first, second and third surfaces, wherein the first surface of the hinge frame has at least one fixing protrusion protruded toward the rear surface of the display module, and the rear surface of the display module has at least one fixing hole corresponding to the fixing protrusion of the first surface.

6. The computer of claim 5, wherein the fixing protrusion is a fastener.

7. The computer of claim 5, wherein the second surface of the hinge frame is screw-coupled with the side wall surface of the display case.

8. A portable computer, comprising:
   a system body;
   a display module having a display surface and a side wall surface;
   a display case having an inner surface; and
   a hinge pivotally coupling the system body to the display case, the hinge including a hinge frame having first, second and third surfaces, the first surface coupled with the inner surface of the display case, the second surface coupled with the side wall surface of the display module, and the third surface is over a portion of the first surface.

9. The computer of claim 8, wherein the display module is a liquid crystal display (LCD) module.

10. The computer of claim 9, wherein the first surface of the hinge frame is screw-coupled with the inner surface of the display case, and the second surface of the hinge frame is screw-coupled with the side wall surface of the display module.

11. A portable computer, comprising:
    a system body;
    a display module having a display surface and a side wall surface, the display module being a liquid crystal display (LCD) module;
    a display case having an inner surface; and
    a hinge pivotally coupling the system body to the display case, the hinge including a hinge frame having first, second and third surfaces, the first surface coupled with the inner surface of the display case, the second surface coupled with the side wall surface of the display module, and the third surface is over a portion of the first surface, wherein the first surface of the hinge frame has at least one fixing protrusion protruded toward the inner surface of the display case, and the inner surface has at least one fixing hole corresponding to the fixing protrusion of the first surface.

12. The computer of claim 11, wherein the fixing protrusion is a fastener.

13. A computer, comprising;
    a system body;
    a display module having a display surface;
    a display case having side walls, the display module secured between the side walls of the display case; and
    a hinge pivotally coupling the body to the display case, the hinge including a hinge frame having first, second and third surfaces, the first surface coupled to the inner surface of the display case, the second surface coupled to the side wall surface of the display case, the third surface over a portion of the first surface.

14. The computer of claim 13, wherein the display module is a liquid crystal display (LCD) module.

15. The computer of claim 14, wherein the hinge frame is screw-coupled with the inner surface of the display case.

16. A computer, comprising:
    a system body;
    a display module having a display surface, the display module being a liquid crystal display (LCD) module;
    a display case having side walls, the display module secured between the side walls of the display case; and
    a hinge pivotally coupling the body to the display case, the hinge including a hinge frame having first, second and third surfaces, wherein the first surface is substantially parallel to the third surface and substantially perpendicular the second surface, the first surface coupled to the inner surface of the display case, wherein the hinge frame has at least one fixing protrusion protruded toward the inner surface of the display case, and the inner surface has at least one fixing hole corresponding to the fixing protrusion of the hinge frame, and wherein the second surface is coupled to one of said side walls of said display case.

17. The computer of claim 16, wherein the fixing protrusion is a fastener.

18. A method for mounting a display module in a portable computer including a system body, a display case having a side wall surface, a hinge having a hinge frame having first, second and third surfaces, the first surface being substantially parallel to a rear surface of the display module, the second surface being substantially parallel to the side wall surface of the display case, and the third surface bring over a portion of the first surface, the hinge pivotally coupling the system body to the display case, the method comprising:

arranging the hinge frame so that the first surface thereof is positioned between the display case and the rear surface of the display case and the rear surface of the display module, and so that the second surface thereof is positioned between the display module and the side wall surface of the display case, and so that the third surface thereof is positioned between the display case and the front surface of the display module;

fastening the first surface of the hinge frame to the rear surface of the display module;

fastening the second surface of the hinge frame to the side wall surface of the display case; and placing the third surface of the hinge frame on the front surface of the display module.

19. The method of claim 18, wherein the display module is a liquid crystal display (LCD) module.

20. The method of claim 18, wherein the first surface of the hinge frame has at least one fixing protrusion protruded toward the rear surface of the display module, and the rear surface of the display module has at least one fixing hole corresponding to the fixing protrusion of the first surface of the hinge frame.

21. The method of claim 18, wherein the first surface of the hinge frame is screw-coupled with the rear surface of the display module.

22. The method of claim 18, wherein the second surface of the hinge frame is screw-coupled with the side wall surface of the display case.

23. A method for mounting a display module having a side wall surface in a portable computer including a system body, a display case having inner and side wall surfaces, a hinge having a hinge frame having first, second and third surfaces, the first surface being substantially parallel to a rear surface of the display module, the second surface being substantially parallel to the side wall surface of the display case, and the third surface being over a portion of the first surface, the hinge pivotally coupling the system body to the display case, the method comprising:

arranging the hinge frame so that the first surface thereof is positioned between the display case and the rear surface of the display case, and so that the second surface thereof is positioned between the display module and the side wall surface of the display case and so that the third surface thereof is positioned between the display case and the front surface of the display module;

fastening the first surface of the hinge frame to the inner surface of the display case;

fastening the second surface of the hinge frame to the side wall surface of the display module; and placing the third surface of the hinge frame on the front surface of the display module.

24. The method of claim 23, wherein the display module is a liquid crystal display (LCD) module.

25. The method of claim 23, wherein the first surface of the hinge frame is screw-coupled with the inner surface of the display case.

26. The method of claim 23, wherein the second surface of the hinge frame is screw-coupled with the side wall surface of the display module.

27. The method of claim 23, wherein the first surface of the hinge frame is coupled to the inner surface of the display case by a fastener.

28. A method for mounting a display module having a side wall surface in a portable computer including a system body, a display case having an inner and two side wall surfaces, a hinge having a hinge frame having a pin portion extending from the hinge frame within the display case, pivotally coupling the system body to the display case, the method comprising:

arranging the hinge frame so that a first surface is positioned between the inner surface of the display case and the rear surface of the display module;

fastening the first surface of the hinge frame to the inner surface of the display case;

securing the display module between the side walls of the display case; and fastening a second of surface of the hinge frame, which is substantially perpendicular to the first surface, to one of the side wall surfaces of the display case.

29. The method of claim 28, wherein the display module is a liquid crystal display (LCD) module.

30. The method of claim 28, wherein the first surface of the hinge frame is screw-coupled with the inner surface of the display case.

31. The method of claim 28, wherein the first surface of the hinge frame is coupled to the inner surface of the display case by a fastener.

32. A method of mounting a display module having a display frame in a portable computer including a system body, a display case having an inner and two side wall surfaces and an extending frame within the display case wherein the extending frame includes first and second surfaces substantially perpendicular to each other, the second surface being substantially parallel to the side wall surfaces, and wherein the display frame includes fixing holes at a rear surface of said display frame wherein the fixing holes do not extend through a depth of the display frame, the method comprising:

arranging the extending frame so that the first surface is positioned between the fixing holes of the display frame and a rear surface of the display case;

fastening the first surface of the extending frame to the display module via the fixing holes;

securing the display module between the side walls of the display case; and fastening the second surface of the extending frame to one of the side wall surfaces of the display case.

* * * * *